Figure 1:
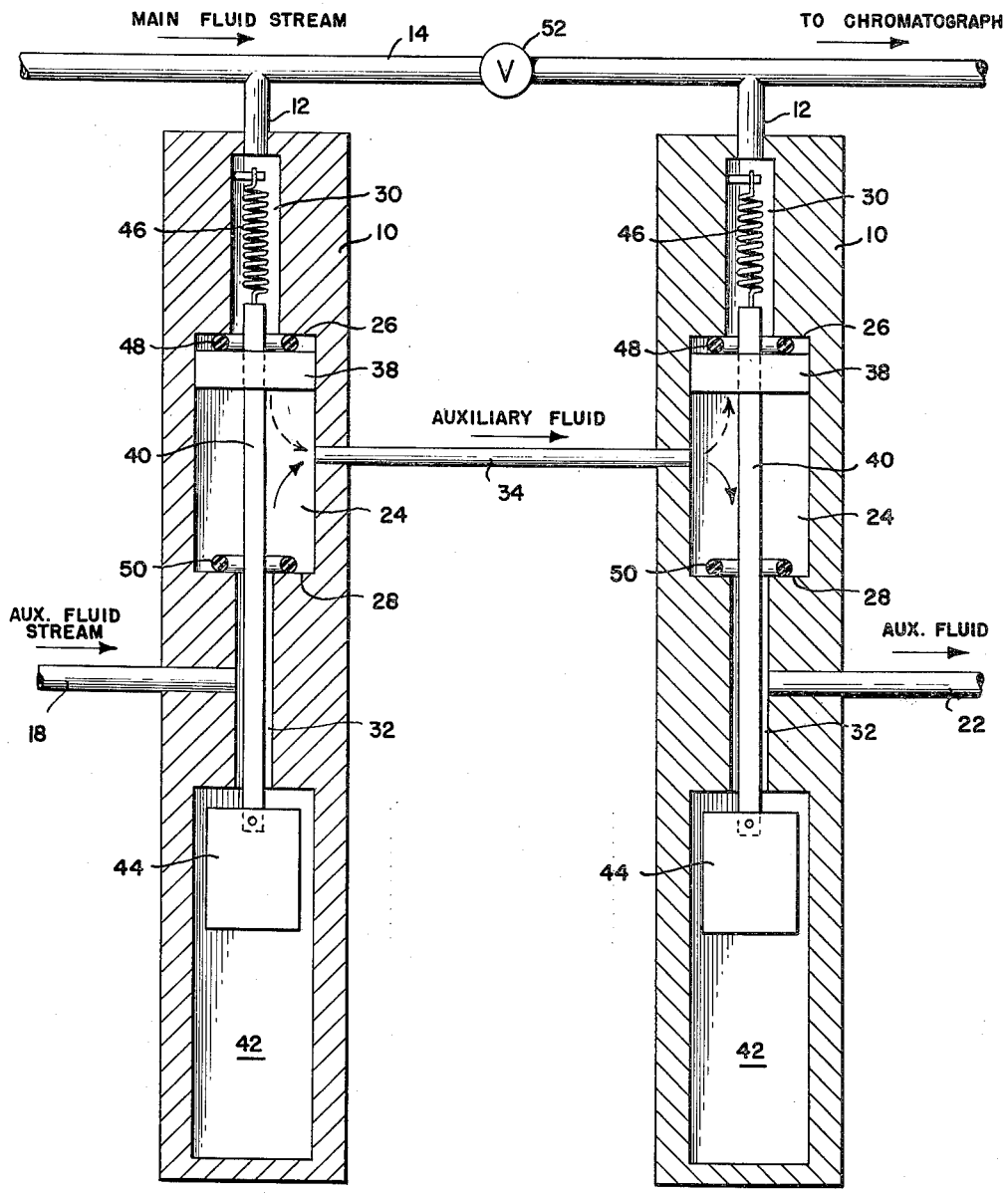

Jan. 23, 1962

J R. WRIGHT 3,017,772

FLUID SAMPLING VALVE

Filed Aug. 25, 1958

2 Sheets-Sheet 2

INVENTOR.
J RONDLE WRIGHT
BY

ATTORNEYS

# United States Patent Office 3,017,772
Patented Jan. 23, 1962

3,017,772
FLUID SAMPLING VALVE
J Rondle Wright, Newtown Square, Pa., assignor to Sun Oil Company, Philadelphia, Pa., a corporation of New Jersey
Filed Aug. 25, 1958, Ser. No. 756,927
8 Claims. (Cl. 73—422)

This invention relates generally to apparatus for transferring to a main fluid stream a quantity of fluid from an auxiliary fluid stream, and more particularly to an improved valve construction for intermittently injecting into a continuously flowing main fluid stream a predetermined volume of fluid from an auxiliary fluid stream.

Valves of the type aforesaid, known as fluid sampling or sample injecting valves, are commonly utilized in connection with apparatus for analyzing gases and vapors by the technique of gas chromatography, which technique lends itself to the accurate estimation of minor components of complex mixtures. The gaseous mixture to be analyzed is diluted with some inert gas such as nitrogen and passed through a column of absorbent such as charcoal or silica gel. The chromatogram may be developed either by elution or displacement with a strongly absorbed substance such as ethyl acetate. The valve functions to inject a predetermined volume from a stream of the gaseous mixture or sample gas, which usually has a flow rate of between 0.5 and 1.0 cc. per minute, into a stream of the nitrogen or other carrier or sweep gas, which usually has a flow rate of between 50 and 100 cc. per minute. The sample volume normally is swept out of the valve in from 5 to 10 seconds. In normal operation, the sweep gas stream is passed through the chromatography apparatus until equilibrium conditions are reached, whereupon a sample is injected into the stream. The apparatus may require from 2 to 30 minutes to complete one cycle.

In the design of such a valve it is desired to achieve certain ends. The valve should be as quick and smooth acting as possible so that the equilibrium of the system is not disturbed. It should be as small and compact as possible so that it may be used where space is limited. The parts of the valve should all be long wearing to reduce to a minimum the cost and inconvenience of making repairs. The force required for operating the valve should be small. Accordingly, a general object of the present invention is to provide an improved construction of the valve that more fully realizes the desired ends aforesaid.

A primary object of the present invention is to provide such a valve wherein the sliding friction developed by moving parts is reduced to a minimum.

Other objects and advantages of the present invention will appear more fully hereinafter, it being understood that the invention consists substantially in the construction, combination, location and relative arrangement of parts, all as described in the accompanying drawings and as finally pointed out in the appended claims.

Figure 2:
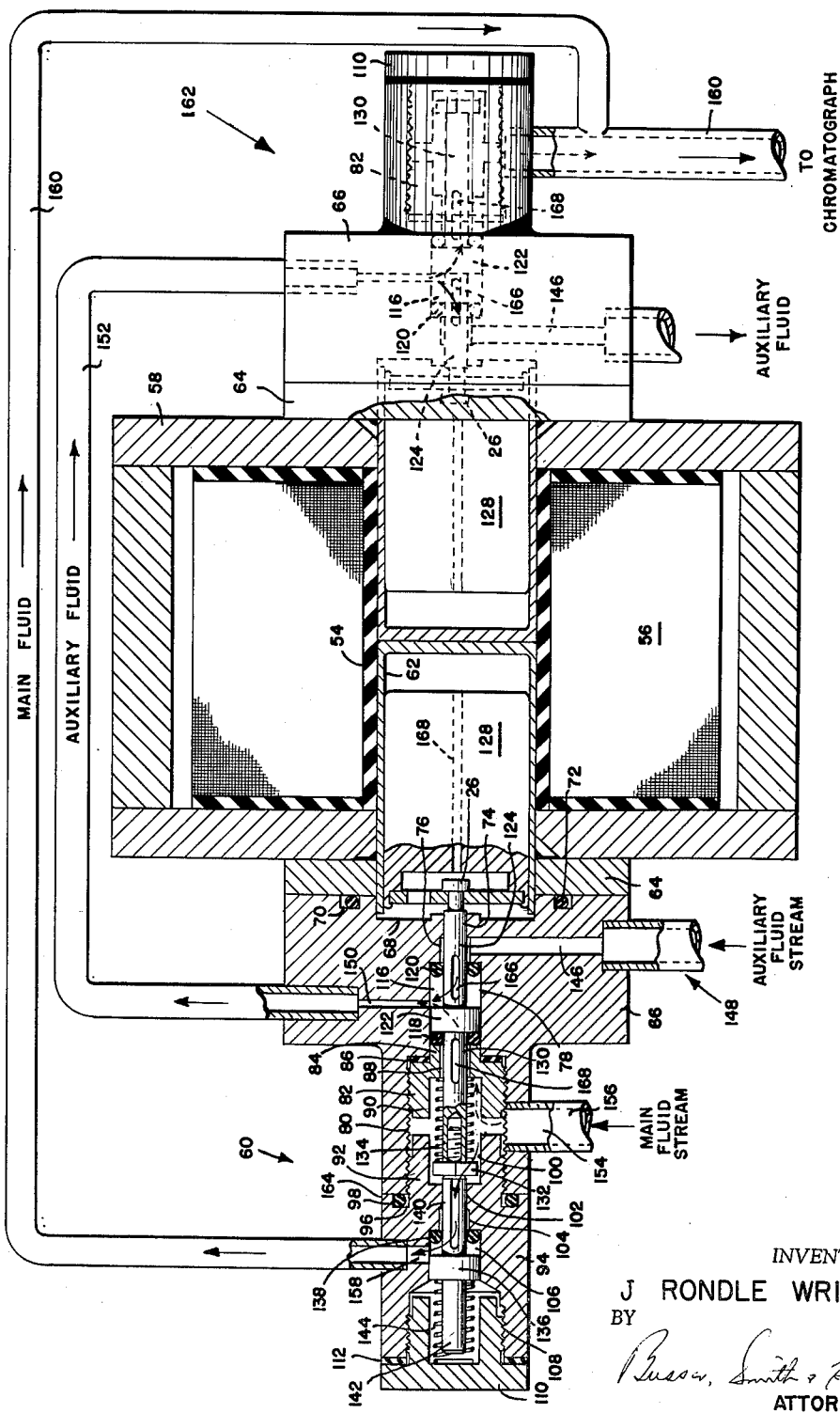

In the accompanying drawings:
FIGURE 1 is a section through apparatus constructed in accordance with and embodying the principles of the present invention.
FIGURE 2 is a section through a modified form of the apparatus constructed in accordance with and embodying the principles of the present invention.

Referring to FIGURE 1, the exemplary apparatus constructed in accordance with and embodying the principles of the present invention comprises a pair of hollow valve body sections 10 each having a connection 12 to a valved main conduit 14. The valve body section on the left side of the figure is additionally connected to an upstream section 18 of an auxiliary conduit, and the valve body section on the right side is additionally connected to a downstream section 22 of the auxiliary conduit. Intermediate the connections of the valve body sections to the main and auxiliary conduits are elongated main valve chambers 24 each having opposite end walls respectively designated 26 and 28, and each communicating with the main conduit through a reduced diameter passage 30 and with the auxiliary conduit through a reduced diameter passage 32. Interconnecting the main chambers 24 is an auxiliary conduit intermediate section 34 having opposite end portions connected into the hollow valve body sections at locations intermediate the opposite ends of the main chamber 24.

Slidably fitted within each main chamber 24 is a main valve 38 mounted upon a valve stem 40, which extends freely through the main chamber 24 and the reduced diameter passage 32 into an auxiliary chamber 42 formed in the hollow valve body section. Mounted upon the end of the valve stem 40 and freely movable in the auxiliary chamber 42 is a solenoid plunger 44. Suitably mounted in the passage 30 is a coil tension spring 46 one end of which is connected to the valve stem 40. Fixed against the opposite end walls 26 and 28 of the main valve chamber 24 are a pair of O-ring seals 48 and 50 surrounding the openings of the passages 30 and 32 into the main valve chamber 24.

In the operation of the apparatus, the tension springs 46 yieldably bias the main valves 38 against the O-ring seals 48, in consequence of which the main fluid stream flows along its normal course through the valve in the main conduit 14, the valve being designated 52. The auxiliary fluid stream flows through the conduit section 18 and passage 32 into the main valve chamber 24 of the valve body section on the left side of the figure. Then it flows through the auxiliary conduit intermediate section 34, from whence it flows into the main valve chamber 24 of the valve body section on the right side of the figure, through the passage 32, and into the downstream section 22 of the auxiliary conduit.

When it is desired to inject into the stream of fluid in the main conduit a predetermined volume from the stream of fluid in the auxiliary conduit, the valves 38 are shifted from their seated positions against the O-ring seals 48 to seated positions upon the O-ring seals 50. Simultaneously, the valve 52 is closed. For effecting operation of the valves 38 and 52 suitable means, e.g., solenoid coils (not shown) arranged to operate upon the plungers 44 are provided. As the valves 38 come into engagement with the O-ring seals 50 they effectively close off the auxiliary conduit intermediate section 34 at both ends thereby to trap therein a predetermined volume of fluid. Then, the main fluid stream, blocked from the course of its normal flow by the closing of the valve 52, is diverted and courses through the passage 30 and the main valve chamber 24 of the valve body section on the left side of the figure, the auxiliary conduit intermediate section 34, the main valve chamber 24 and the passage 30 of the valve body section on the right side of the figure and back into the main conduit 14, in consequence of which the trapped fluid in the auxiliary conduit intermediate section 34 is swept out into the main fluid stream. After sufficient time has elapsed to assure complete removal of the trapped fluid from the auxiliary conduit intermediate section 34, the valves 38 are released, whereupon they return to their initial positions under the influence of the tension coil springs 46.

It will be observed that there is an annular space within each auxiliary chamber 42 extending about the plunger 44, which space provides for freedom of movement of the plunger 44 within the auxiliary chamber 42, the latter being flooded with the auxiliary stream fluid.

Now referring to FIGURE 2, the modified apparatus constructed in accordance with and embodying the principles of the present invention comprises a spool 54 mounting a solenoid coil 56 all encased in a metal housing 58. The section of the valve body on the left side of the figure, generally designated 60, comprises a cylinder 62 projected by a closed end thereof into the housing 58 and into the spool 54. The outer end of the cylinder 62 is open, and fitted thereover is a collar 64 secured to the casing 58. Seated upon the collar 64 is a valve body part 66 having formed therein a depression 68 that receives the terminal portion of the cylinder 62. The surface of the valve body part 66 next to the collar 64 is provided with an annular groove 70 which is fitted with an O-ring seal 72. The valve body part 66 is provided with a central bore having a bore section 74 and progressively larger successive bore sections 76, 78 and 80.

Threaded into the bore section 80 is a sleeve 82 having a reduced diameter inner end portion 84 projected into the bore section 78, and embracing the reduced diameter portion 84 of the sleeve 82 is a gasket 86. The sleeve 82 is provided with a central bore having a bore section 88 and an enlarged bore section 90.

Also threaded into the bore section 80 is a reduced end portion 92 of an auxiliary valve body part 94, which latter is provided with an annular groove 96 fitted with an O-ring seal 98. The auxiliary valve body part 94 is provided with a central bore having a bore section 100 communicating with a restricted bore section 102 and progressively larger successive bore sections 104, 106 and 108.

Threaded into the bore section 108 is a hollow plug 110 having under the head thereof a gasket 112.

The bore section 78 formed in the valve body part 66 provides a main valve chamber 116 extending axially between the transversely extending terminal surface at the inner end of the sleeve 82 and the transversely extending surface between the bore sections 78 and 76. Fixed against the outer and inner ends of the chamber 116 respectively are a pair of O-ring seals 118 and 120. Slidably fitted in the main valve chamber is a main valve 122. Extending inwardly from the latter is a valve stem part 124 projecting freely through the O-ring 120, the bore sections 76 and 74 and into the cylinder 62 for connection with a solenoid plunger 128 slidably fitted in the cylinder 62. Extending outwardly from the main valve 122 is a valve stem part 130 projecting freely through the O-ring seal 118, the central bore of the sleeve 82 and into the bore section 100 of the auxiliary valve body part 94. Threaded into the outer end of the valve stem part 130 is a stud 132, and wrapped around the valve stem part 130, and acting upon the head of the stud 132, is a compression coil spring 134.

The bore section 106 formed in the auxiliary valve body part 94 provides an auxiliary chamber within which there is slidably fitted an auxiliary valve 136. Fixed against the transversely extending surface between the bore sections 104 and 106 is an O-ring seal 138. Extending inwardly from the valve member 136 is a valve stem part 140 projecting freely through the O-ring seal 138 and the bore sections 104 and 102 for abutting the head of the stud 132. Extending outwardly from the auxiliary valve member 136 and into the hollow interior of the plug 110 is a second valve stem part 142 having wrapped thereabout a coil compression spring 144.

The valve body part 66 is provided with a radially extending passage 146 placing the bore section 76 in communication with an upstream section 148 of an auxiliary conduit, a radially extending passage 150 placing the main valve chamber 116 in communication with an intermediate section 152 of the auxiliary conduit, and a radially extending passage 154 placing the space between the sleeve 82 and the auxiliary valve body part 94 and surrounding the valve stem part 130 in communication with a section 156 of the main conduit. The auxiliary valve body part 94 is provided with a radially extending passage 158 placing the bore section 106 in communication with a section 160 of the main conduit.

The section of the valve body on the right side of the figure, generally designated 162, is identical with that on the left side of the figure, just described, except that the auxiliary valve part is omitted and the plug 110 is threaded directly into the bore 80 of the valve body part 66.

In the operation of the apparatus, the main valve members 122 are seated against the O-ring seals 118 by the action of the compression coil springs 134. Referring particularly to the valve body section 60, the compression coil spring 134 is sufficiently powerful to overcome the influence of the compression coil spring 144 thereby to maintain the auxiliary valve member 136 in the open position shown.

In this condition of the apparatus, the main fluid stream passes through the main conduit section 156 into the space surrounding the valve stem part 130, through an elongated opening 164 formed in the valve stem part 140 into the auxiliary chamber in which the auxiliary valve member 136 operates, and through the passage 158 into the main conduit section 160, as indicated by full line arrows. The auxiliary fluid stream passes through the upstream section 148 of the auxiliary conduit and the passage 146 into the annular space in the bore 76 surrounding the valve stem part 124, from when it flows through an elongated opening 166 formed in the valve stem part 124, through the main valve chamber 116 and the passage 150 into the auxiliary conduit intermediate section 152, as indicated by full line arrows.

When it is desired to inject into the main conduit a predetermined volume of fluid from the auxiliary conduit, the solenoid coil 56 is energized, whereupon the plungers 128 are drawn inwardly toward one another. It will be noted that the interiors of the cylinders 62 provide auxiliary chambers that are flooded with the auxiliary stream fluid, and to provide for freedom of movement of the plungers 128 in these auxiliary chambers, the plungers 128 are furnished with through openings 168. Thus the main valve members 122 traverse the main valve chambers 116, being thereby shifted, against the influence of the compression coil springs 134, from their seated positions against the O-ring seals 118 to seated positions upon the O-rings 120. In the case of the valve body section 60, when the main valve member 122 is shifted in the manner aforesaid, the auxiliary valve member 136 is released, in consequence of which it shifts axially inwardly under the influence of the compression coil spring 144 and engages the O-ring seal 138. As the main valve members 122 seat against the O-rings 120, they trap a predetermined volume of fluid in the auxiliary conduit intermediate section 152, and as they approach the O-ring seals 120 the main fluid stream changes its course. It flows as described hereinbefore into the space surrounding the valve stem part 130, then through an elongated opening 168 in the valve stem part 130 into the main valve chamber 116, from whence it flows through passage 150 into the auxiliary conduit intermediate section 152, in consequence of which the fluid trapped as aforesaid is swept out of the auxiliary conduit intermediate section 152 into the main conduit section 160, as indicated by the broken line arrows.

It will be evident that the arrangement of the main valve members and the O-ring seals in the main valve chambers, and the organization of the valve stem parts, the O-ring seals and the bore surfaces surrounding the valve stem parts is such that O-ring seals embracing the main valve members and carried thereby are superfluous, and such that generally the sliding friction developed by moving parts is reduced to a minimum, in consequence of which the force required for operation of the main valves is very small. The apparatus inherently lends itself to construction in the form of a small, compact unit.

Since the O-ring seals in the main valve chambers are not required to withstand any substantial amount of sliding friction, the life thereof is greatly prolonged. In addition, no packing glands are required to hermetically seal and make the apparatus explosion proof. Furthermore, the apparatus is fast and smooth acting so that there is no appreciable interruption in the flow of the main stream of fluid.

It will be understood, of course, that the present invention as hereinbefore described and as shown in the accompanying drawings is susceptible of various changes and modifications which may be made from time to time without departing from the general principles or real spirit of the invention.

I claim:

1. Apparatus for injecting into a stream of fluid in a main conduit a predetermined fluid volume from a stream of fluid in an auxiliary conduit, comprising a pair of chambered valve body sections, means connecting one end of each respective chamber directly into said main conduit by way of an opening in one end wall of each respective chamber, means connecting the other end of the first chamber into the upstream section of said auxiliary conduit by way of an opening in the other end wall of said first chamber, means connecting the other end of the second chamber into the downstream section of said auxiliary conduit by way of an opening in the other end wall of said second chamber, a first valve member reciprocable in the first chamber between the ends thereof, sealing means interposed between each end wall of said first chamber and the respective cooperating face of said first valve member, a second valve member reciprocable in the second chamber between the ends thereof, sealing means interposed between each end wall of said second chamber and the respective cooperating face of said second valve member, an intermediate section of said auxiliary conduit connected at one end to said first chamber between the ends thereof and connected at its other end to said second chamber between the ends thereof; and means for operating said valve members respectively to sealing positions at the said other ends of the respective chambers, thereby to seal off both ends of said intermediate conduit section from said auxiliary fluid stream and to place the ends of said intermediate conduit section in communication with said main fluid stream.

2. Apparatus as defined in claim 1, wherein the sealing means are elements each permanently fixed against, and surrounding the opening in, the associated chamber end wall.

3. Apparatus as defined in claim 1, wherein the valve members are yieldably biased respectively to sealing positions at the said one ends of the respective chambers.

4. Apparatus as defined in claim 1, including also means for checking the normal flow through said main conduit, and means for operating said checking means along with the operation of said valve members respectively to sealing positions at the said other ends of the respective chambers.

5. Apparatus as defined in claim 1, wherein the valve members are provided with elongated stems extending freely respectively into a pair of auxiliary chambers formed in said valve body sections and communicating respectively with the upstream and downstream sections of said auxiliary conduit, and wherein the means for operating said valve members includes solenoid coil means effective when energized to shift said stems axially, thereby to operate said valve members simultaneously.

6. Apparatus as defined in claim 1, wherein the valve members are provided with elongated stems extending freely respectively into a pair of auxiliary chambers formed in said valve body sections and communicating respectively with the upstream and downstream sections of said auxiliary conduit, and wherein the means for operating said valve members includes a pair of solenoid plunger members respectively secured to said stems and freely movable in said auxiliary chambers, and solenoid coil means surrounding said plunger members and effective when energized to shift said plunger, stem, and valve members simultaneously as a unit.

7. Apparatus as defined in claim 1, wherein the valve members are provided with elongated stems extending freely respectively into a pair of auxiliary chambers formed in said valve body sections and communicating respectively with the upstream and downstream sections of said auxiliary conduit, and wherein the means for operating said valve members includes a pair of solenoid plunger members respectively secured to said stems and freely movable in said auxiliary chambers, spring means biasing said plunger, stem, and valve members as a unit, and solenoid coil means surrounding said plunger members and effective when energized to shift said plunger, stem, and valve members simultaneously as a unit against the influence of said spring bias.

8. Apparatus as defined in claim 1, wherein the valve members are provided with elongated stems extending freely respectively into a pair of auxiliary chambers formed in said valve body sections and communicating respectively with the upstream and downstream sections of said auxiliary conduit, the valve body sections being positioned in axial alignment with the auxiliary chamber ends thereof next to one another; and wherein the means for operating said valve members includes a pair of solenoid plunger members respectively secured to said stems and freely movable in said auxiliary chambers, and solenoid coil means surrounding the auxiliary chamber ends of said valve body sections and effective when energized to shift said plunger, stem, and valve members simultaneously as a unit.

References Cited in the file of this patent

UNITED STATES PATENTS

| | | |
|---|---|---|
| 2,288,912 | Mears | July 7, 1942 |
| 2,353,765 | Mathisen | July 18, 1944 |
| 2,735,047 | Garner et al. | Feb. 14, 1956 |
| 2,830,738 | Sorg | Apr. 15, 1958 |
| 2,833,151 | Harvey | May 6, 1958 |
| 2,846,121 | Ronnebeck | Aug. 5, 1958 |
| 2,927,606 | Matchett et al. | Mar. 8, 1960 |